(12) United States Patent
Lemaire et al.

(10) Patent No.: US 7,830,889 B1
(45) Date of Patent: Nov. 9, 2010

(54) SYSTEMS FOR SCHEDULING THE TRANSMISSION OF DATA IN A NETWORK DEVICE

(75) Inventors: Thomas Lemaire, Acton, MA (US);
Daniel K. Siu, Westford, MA (US);
Albert E. Patnaude, Jr., Amherst, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 2036 days.

(21) Appl. No.: 10/359,215

(22) Filed: Feb. 6, 2003

(51) Int. Cl.
*H04L 12/56* (2006.01)
(52) U.S. Cl. .................... 370/395.4; 370/419
(58) Field of Classification Search ................ 370/230, 370/235, 395.4, 395.41, 395.42, 409, 412, 370/419, 229, 231, 236, 252, 389, 413
See application file for complete search history.

(56) References Cited

U.S. PATENT DOCUMENTS

| | | | |
|---|---|---|---|
| 6,621,791 B1 * | 9/2003 | Davie | 370/230 |
| 6,798,743 B1 * | 9/2004 | Ma et al. | 370/235 |
| 7,006,438 B2 * | 2/2006 | West et al. | 370/231 |
| 7,023,857 B1 * | 4/2006 | Chiussi et al. | 370/395.4 |
| 7,027,457 B1 * | 4/2006 | Chiussi et al. | 370/414 |
| 7,317,683 B2 * | 1/2008 | Goetzinger et al. | 370/230.1 |
| 7,362,706 B2 * | 4/2008 | Grosbach et al. | 370/230.1 |
| 2003/0016685 A1 * | 1/2003 | Berggreen | 370/412 |
| 2003/0231593 A1 * | 12/2003 | Bauman et al. | 370/235 |
| 2004/0062261 A1 * | 4/2004 | Zecharia et al. | 370/419 |
| 2005/0047415 A1 * | 3/2005 | Channegowda et al. | 370/395.4 |

* cited by examiner

*Primary Examiner*—Aung S Moe
*Assistant Examiner*—Feben Haile
(74) *Attorney, Agent, or Firm*—Harrity & Harrity, LLP

(57) ABSTRACT

In a network device, a line card includes a first scheduler configured to perform scheduling for data units of a first type and a second scheduler that is connected in series to the first scheduler and configured to perform scheduling for data units of a second type. The schedulers may be configured in a variety of ways to achieve certain data unit flow characteristics.

17 Claims, 7 Drawing Sheets

SYSTEMS FOR SCHEDULING THE TRANSMISSION OF DATA IN A NETWORK DEVICE

BACKGROUND OF THE INVENTION

1. Field of the Invention

The present invention relates generally to data transfer, and more particularly, to systems for scheduling the transmission of data in a network device.

2. Description of Related Art

Routers receive data on a physical media, such as optical fiber, analyze the data to determine its destination, and output the data on a physical media in accordance with the destination. Routers were initially designed using a general purpose processor executing large software programs. As line rates and traffic volume increased, however, general purpose processors could not scale to meet these new demands. For example, as functionality was added to the software, such as accounting and policing functionality, these routers suffered performance degradation. In some instances, the routers failed to handle traffic at line rate when the new functionality was turned on.

To meet the new demands, purpose-built routers were designed with components, such as a scheduler, optimized for routing. Typical asynchronous transfer mode (ATM) line cards, for example, schedule cells onto a link using a cell scheduler (SAR) that conforms to ATM scheduling disciplines, as defined in the ATM Forum specifications. Conventional SARs do not provide, however, quality of service (QoS) scheduling, such as weighted round robin scheduling, per-packet strict priority scheduling, hierarchical virtual path-virtual circuit scheduling, and the like, which are desirable to Internet Service Providers (ISPs).

Accordingly, it is desirable to improve scheduling in a network device.

SUMMARY OF THE INVENTION

Systems consistent with the principles of the invention address this and other needs by providing a network device that includes a first stage scheduler and a second stage scheduler that can be configured by a user to meet the user's needs. In one implementation, the first stage scheduler implements the requirements for hierarchical virtual path-virtual circuit scheduling, minimum assured rates using relative weights, and per-packet strict priority. The second stage scheduler shapes traffic on, for example, a per cell basis to ensure conformance with Cell Delay Variation Tolerance (CDVT).

One aspect consistent with principles of the invention is directed to a system for scheduling of data units in a network device. The system includes a first scheduler configured to perform quality of service (QoS) scheduling on a per-data unit basis and a second scheduler, connected in series to the first scheduler, and configured to schedule data units on a media-specific basis.

A second aspect consistent with principles of the invention is directed to a line card in a network device. The line card includes a first scheduler configured to perform scheduling for data units of a first type and a second scheduler connected in series to the first scheduler and configured to perform scheduling for data units of a second type.

A third aspect consistent with principles of the invention is directed to a network device. The network device includes a first scheduler configured to perform QoS scheduling on one of a virtual circuit and virtual path basis and a second scheduler connected in series to the first scheduler and configured to perform shaping on the one virtual circuit and virtual path basis.

A fourth aspect consistent with the principles of the invention is directed to a network device that includes a first scheduler configured to transfer data units based on QoS parameters. The network device further includes a second scheduler configured to control the transfer of data units from the first scheduler based on a number of data units in the second scheduler and transfer the data units on a network link.

A fifth aspect consistent with the principles of the invention is directed to a network device that includes one or more line cards. At least one of the one or more line cards includes a first scheduler and a second scheduler. The first scheduler and the second scheduler are connected in series and configured to operate in one of a first mode based on virtual circuit backpressure, a second mode based on port backpressure, and a third mode based on symmetric shaping of the first and second schedulers.

A sixth aspect consistent with the principles of the invention is directed to a network device that includes a line card. The line card includes means for providing per-data unit strict priority scheduling, means for providing weighted round robin scheduling on a virtual circuit basis, and means for providing hierarchical virtual path-to-virtual circuit scheduling.

A seventh aspect consistent with the principles of the invention is directed to a method for transmitting data units on an output link of a network device that includes a first scheduler and a second scheduler. The method includes configuring the network device to operate in one of a group of modes. In a first of the group of modes, the first scheduler includes a group of virtual circuit management nodes, and the second scheduler includes a group of queues, where each queue corresponds to one of the group of virtual circuit management nodes, is associated with an upper threshold, and is configured to transmit a backpressure message to the corresponding virtual management node when a contents of the respective queue exceeds the upper threshold. The backpressure message instructs the corresponding virtual management node to stop sending traffic to the respective queue. In a second of the group of modes, the second scheduler includes at least one output port including a buffer, where the buffer is associated with an upper threshold, and is configured to transmit a port backpressure message to the first scheduler when the contents of the buffer exceeds the upper threshold. The port backpressure message instructs the first scheduler to stop sending traffic to the output port. In a third of the group of modes, the first scheduler performs weighted round robin scheduling and per-data unit strict priority scheduling, and the second scheduler performs round robin scheduling. The method further includes transmitting data units on the output link based on the configuring.

An eighth aspect consistent with the principles of the invention is directed to a method for scheduling data units for transmission by a network device. The method includes providing a first scheduler for performing quality of service (QoS) scheduling of data units, transferring the QoS-scheduled data units to a second scheduler, and performing shaping in the second scheduler.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described herein, a first stage scheduler and a second stage scheduler are used to improve the scheduling of data units in a network device.

System Configuration

Figure 1:
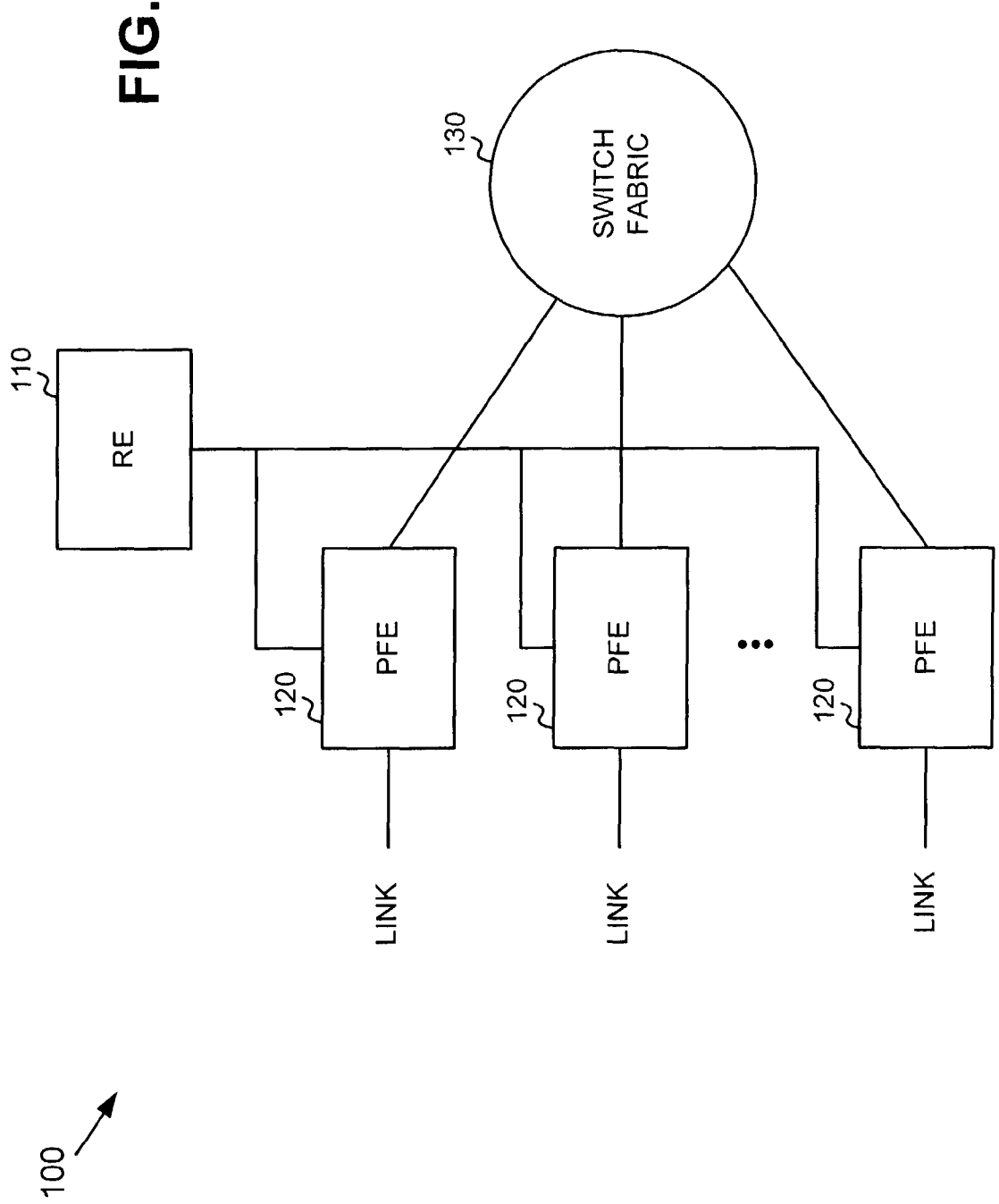
FIG. 1 is a block diagram illustrating an exemplary routing system in which systems consistent with the principles of the invention may be implemented.

FIG. 1 is a block diagram illustrating an exemplary routing system 100 in which systems and methods consistent with the principles of the invention may be implemented. System 100 receives one or more packet streams from a physical link, processes the packet stream(s) to determine destination information, and transmits the packet stream(s) out on a link in accordance with the destination information. System 100 may include a routing engine (RE) 110, packet forwarding engines (PFEs) 120, and a switch fabric 130.

RE 110 performs high level management functions for system 100. For example, RE 110 communicates with other networks and systems connected to system 100 to exchange information regarding network topology. RE 110 creates routing tables based on network topology information, creates forwarding tables based on the routing tables, and forwards the forwarding tables to PFEs 120. PFEs 120 use the forwarding tables to perform route lookup for incoming packets. RE 110 also performs other general control and monitoring functions for system 100.

PFEs 120 are each connected to RE 110 and switch fabric 130. PFEs 120 receive packet data on physical links connected to a network, such as a wide area network (WAN) or a local area network (LAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

A PFE 120 may process incoming packet data prior to transmitting the data to another PFE or the network. PFE 120 may also perform a route lookup for the data using the forwarding table from RE 110 to determine destination information. If the destination indicates that the data should be sent out on a physical link connected to PFE 120, then PFE 120 prepares the data for transmission by, for example, adding any necessary headers, and transmits the data from the port associated with the physical link. If the destination indicates that the data should be sent to another PFE via switch fabric 130, then PFE 120 prepares the data for transmission to the other PFE, if necessary, and sends the data to the other PFE via switch fabric 130.

Figure 2:
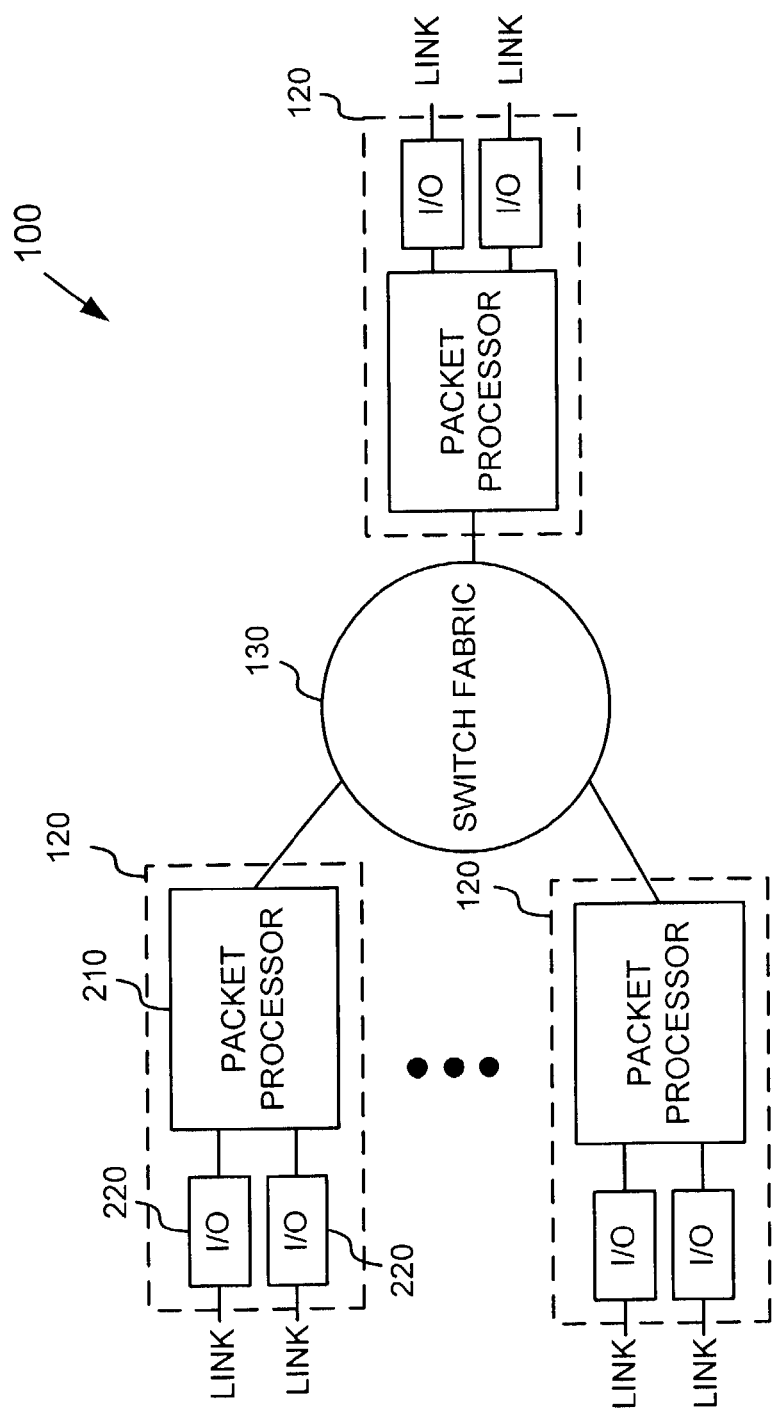
FIG. 2 is a detailed block diagram illustrating portions of the routing system of FIG. 1.

FIG. 2 is a detailed block diagram illustrating portions of routing system 100. PFEs 120 connect to one another through switch fabric 130. Each of PFEs 120 may include one or more packet processors 210 and input/output (I/O) interfaces 220. Although FIG. 2 shows two I/Os 220 connected to each of packet processors 210 and three packet processors 210 connected to switch fabric 130, in other embodiments consistent with principles of the invention there can be more or fewer I/Os 220 and packet processors 210.

Each of packet processors 210 performs routing functions and handle packet transfers to and from I/Os 220 and switch fabric 130. For each packet it handles, packet processor 210 performs the previously-discussed route lookup function and may perform other processing-related functions.

I/Os 220 may transmit data between a physical link and packet processor 210. In one implementation, each of I/Os 220 may be a line card. Different I/Os 220 may be designed to handle different types of network links. For example, one of I/Os 220 may be an interface for an optical link while another of I/Os 220 may be an interface for an Ethernet link, implementing any of a number of well-known protocols. It will be assumed hereafter that one of I/Os 220 transmits data onto the physical link using the ATM protocol. It will be appreciated, however, that implementations consistent with the principles of the invention are equally applicable to other protocols.

Figure 3:
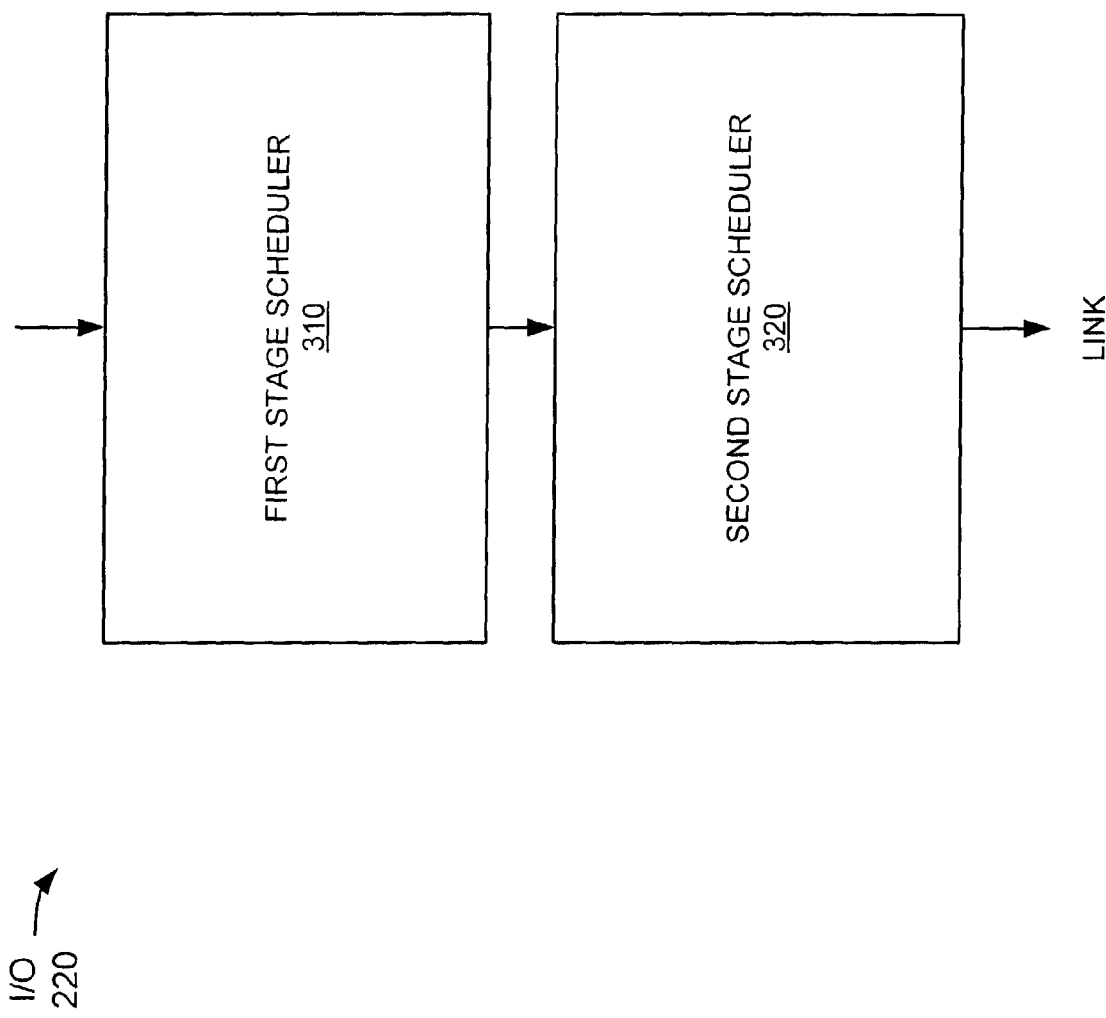
FIG. 3 is a block diagram illustrating an exemplary configuration of the input output (I/O) device of FIG. 2 in an implementation consistent with the principles of the invention.

FIG. 3 is a block diagram illustrating an exemplary configuration of one of I/Os 220 in an implementation consistent with the principles of the invention. As illustrated, I/O 220 includes a first stage scheduler 310 and a second stage scheduler 320. In one implementation, first and second stage schedulers 310 and 320 may be connected in series and formed on a single application-specific integrated circuit (ASIC) or separate ASICs. Each scheduler 310 and 320 may include 32 megabytes of memory for storing data units (e.g., packets, cells, etc.) for transfer onto the network link.

As will be described below, schedulers 310 and 320 improve the scheduling of ATM cells (or other data units) transmitted over the network link. Schedulers 310 and 320 may include hierarchical architectures, where each of schedulers 310 and 320 may include queues, having predetermined weights and rates, and scheduler nodes that manage a group of queues and have their own weights and rates. Schedulers 310 and 320 provide the ability to allocate bandwidth based on configured minimum assured rates through the use of weighted round robin scheduling, provide hierarchical virtual path (VP)-to-virtual circuit (VC) scheduling, and provide per-packet strict priority scheduling. Schedulers 310 and 320 may be integrated in any of three different, user-configurable modes: an ATM mode, a low-latency mode, and a low cell delay variation (CDV) mode with strict priority.

In each of the modes described below, first stage scheduler 310 is a packet scheduler capable of implementing various types of scheduling, such as per-packet strict priority, weighted round robin, etc. Second stage scheduler 320 is a media-specific scheduler, such as an ATM scheduler. In one implementation, second stage scheduler 320 is a cell scheduler (SAR).

Figure 4:
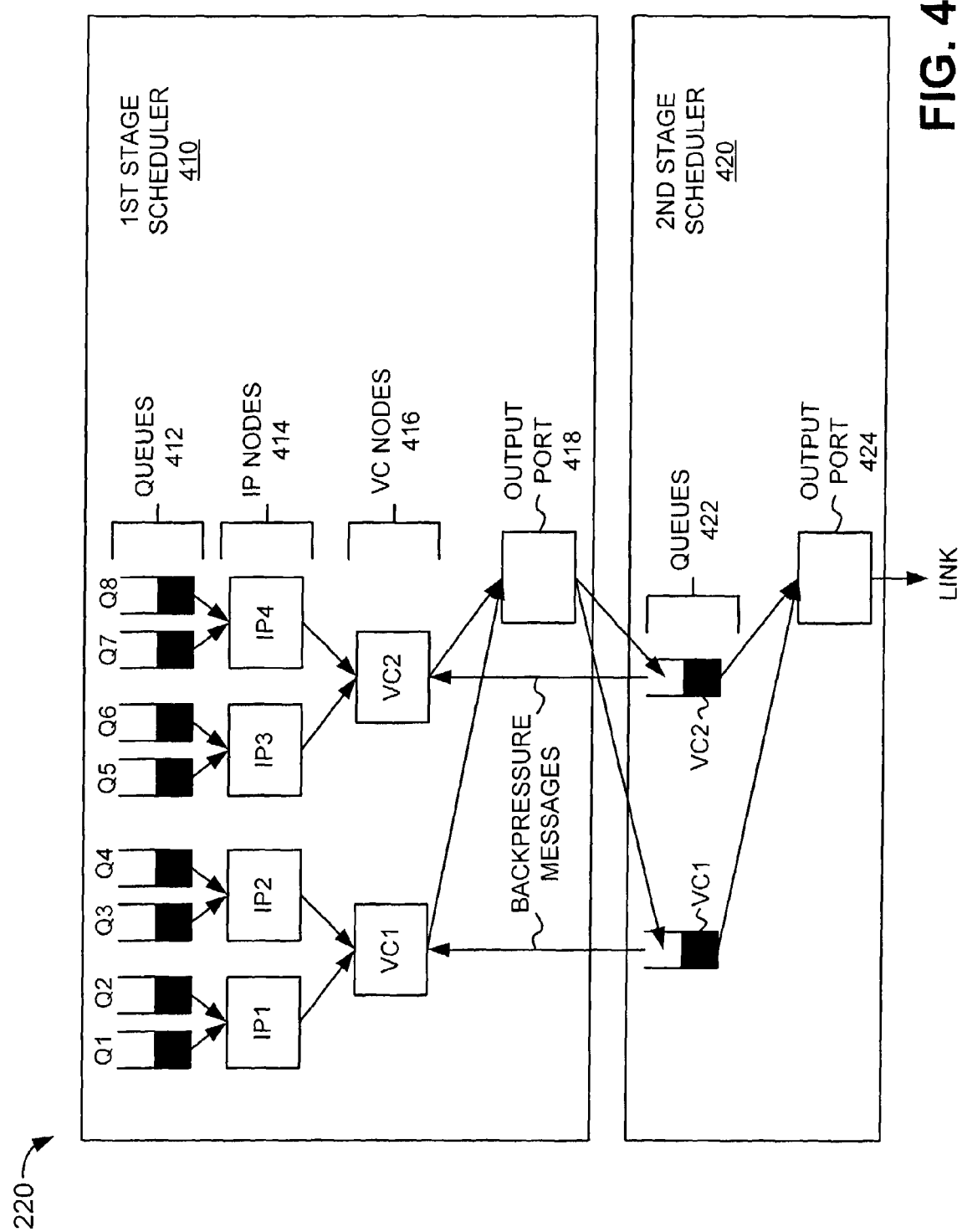
FIG. 4 is a block diagram illustrating an exemplary configuration of the schedulers of the I/O device when configured in the ATM mode in an implementation consistent with the principles of the invention.

FIG. 4 is a block diagram illustrating an exemplary configuration of the schedulers of I/O 220 when configured in the ATM mode in an implementation consistent with the principles of the invention. As illustrated, first stage scheduler 410 may include a buffer pool, represented as a group of individual queues 412 in FIG. 4, a group of Internet Protocol (IP) nodes 414, a group of VC nodes 416, and an output port 418. Queues 412 may store traffic, for example, in the form of packets, for transfer on the network link. Each queue may be associated with a weight and a rate. The weight provides a bandwidth minimum, while the rate provides a bandwidth maximum. One or more queues 412 may be associated with a respective one of IP nodes 414, where each queue is associated with traffic of a different priority. For example, one of queues 412 may be associated with best-effort traffic (i.e., low priority traffic), while the other queue associated with one of IP nodes 414 may be associated with high priority traffic (e.g., streaming video).

IP nodes 414 and VC nodes 416 may be referred to more generally as "scheduler nodes" that manage the nodes or queues 412 connected above the particular node in the hierarchical structure. For example, each of IP nodes 414 manages queues 412 connected to respective IP nodes 414. In so doing, each of IP nodes 414 allocates bandwidth between the queues connected to the respective IP node. As an example, IP node IP1 allocates bandwidth between queues Q1 and Q2. Similar to queues 412, IP nodes 414 may be associated with a weight and rate.

VC nodes 416 manage those IP nodes 414 connected thereto. For example, VC node VC1 manages IP nodes IP1 and IP2. Each of VC nodes 416 may be associated with a weight and rate. In one implementation consistent with the principles of the invention, IP nodes 414 and VC nodes 416 contain no buffering, but merely select the queue or node from which traffic is to be routed. Output port 418 receives traffic from a VC node 416 and transmits the received traffic in the form of cells to second stage scheduler 420. In one implementation, output port 418 is physical wire having some amount of bandwidth (e.g., 155 megabits for the OC3 protocol). First stage scheduler 410 may determine from which of VC nodes 416 traffic will be routed to second stage scheduler 420 based on QoS parameters (e.g., weights associated with VC nodes 416).

Second stage scheduler 420 may include a buffer pool, represented as a group of individual queues 422 in FIG. 4, and an output port 424. Queues 422 may store information received from first stage scheduler 410. In one implementation consistent with the principles of the invention, each of queues 422 corresponds to one of VC nodes 416 in first stage scheduler 410. For example, queue VC1 in second stage scheduler 420 corresponds to VC node VC1 in first stage scheduler 410. Each of queues 422 stores a small amount of data. For example, each of queues 422 may store a few hundred bytes of data. By keeping the number of cells in queues 422 small, the bulk of the congestion in I/O 220 would be in first stage scheduler 410 where first stage scheduler 410 can control what traffic drains into each of VC nodes 416.

Each of queues 422 may be associated with two user-configurable thresholds that allow second stage scheduler 420 to control the transmission of cells to queues 422 on a per VC basis. The first threshold is an upper threshold that may direct each of queues 422 to send a VC backpressure message to first stage scheduler 410 when the number of cells in the queue is above the first threshold. The VC backpressure message directs first stage scheduler 410 to stop sending cells to this particular one of queues 422 (i.e., for this particular VC). The second threshold is a lower threshold that directs one of queues 422 to send a VC backpressure release message to first stage scheduler 410. The VC backpressure release message directs first stage scheduler 410 to resume sending cells to this one of queues 422 (i.e., for this particular VC). In one implementation consistent with the principles of the invention, the difference between the upper threshold and the lower threshold may be less than the size of an average packet. Therefore, a packet of any reasonable size will cause a VC backpressure message to be sent. As will be described below, the upper and lower thresholds can alternatively be dynamically adjusted.

Output port 424 receives cells from queues 422 and transmits the received cells on the network link. In one implementation, output port 424 is physical wire having some amount of bandwidth (e.g., 155 megabits for the OC3 protocol). Output port 424 may receive a cell from each of queues 422 in a round-robin fashion. That is, output port 424 may transmit a cell on the network link from each of queues 422 in turn and then start over and transmit a cell from each of queues 422 again.

To summarize, when in the ATM mode, second stage scheduler 420 is the more dominant scheduler of schedulers 410 and 420. When first stage scheduler 410 has traffic to send to second stage scheduler 420, first stage scheduler 410 may decide from which of VC nodes 416 traffic will be routed. As set forth above, this decision may be based on weighted round robin scheduling (where certain VC nodes 416 may be given greater weight and thereby allowed to transfer more traffic than lower weighted VC nodes 416) or some other type of QoS techniques. Assume for example, that VC node VC1 is permitted to transmit traffic to second stage scheduler 420. As a result, a cell may be transmitted to queue VC1 in second stage scheduler 420 via output port 418. If this cell causes the amount of data stored in queue VC1 to exceed its upper threshold, queue VC1 may transmit a VC backpressure message to first stage scheduler 410 to direct first stage scheduler 410 to stop sending cells to queue VC1.

In second stage scheduler 420, cells may be transmitted from queues 422 in a round robin fashion in order to interleave the transmission of cells on the network link. When the amount of data in queue VC1 goes below the lower threshold, queue VC1 may transmit a VC backpressure release message to first stage scheduler 410 instructing first stage scheduler 410 to resume sending cells to queue VC1.

Figure 5:
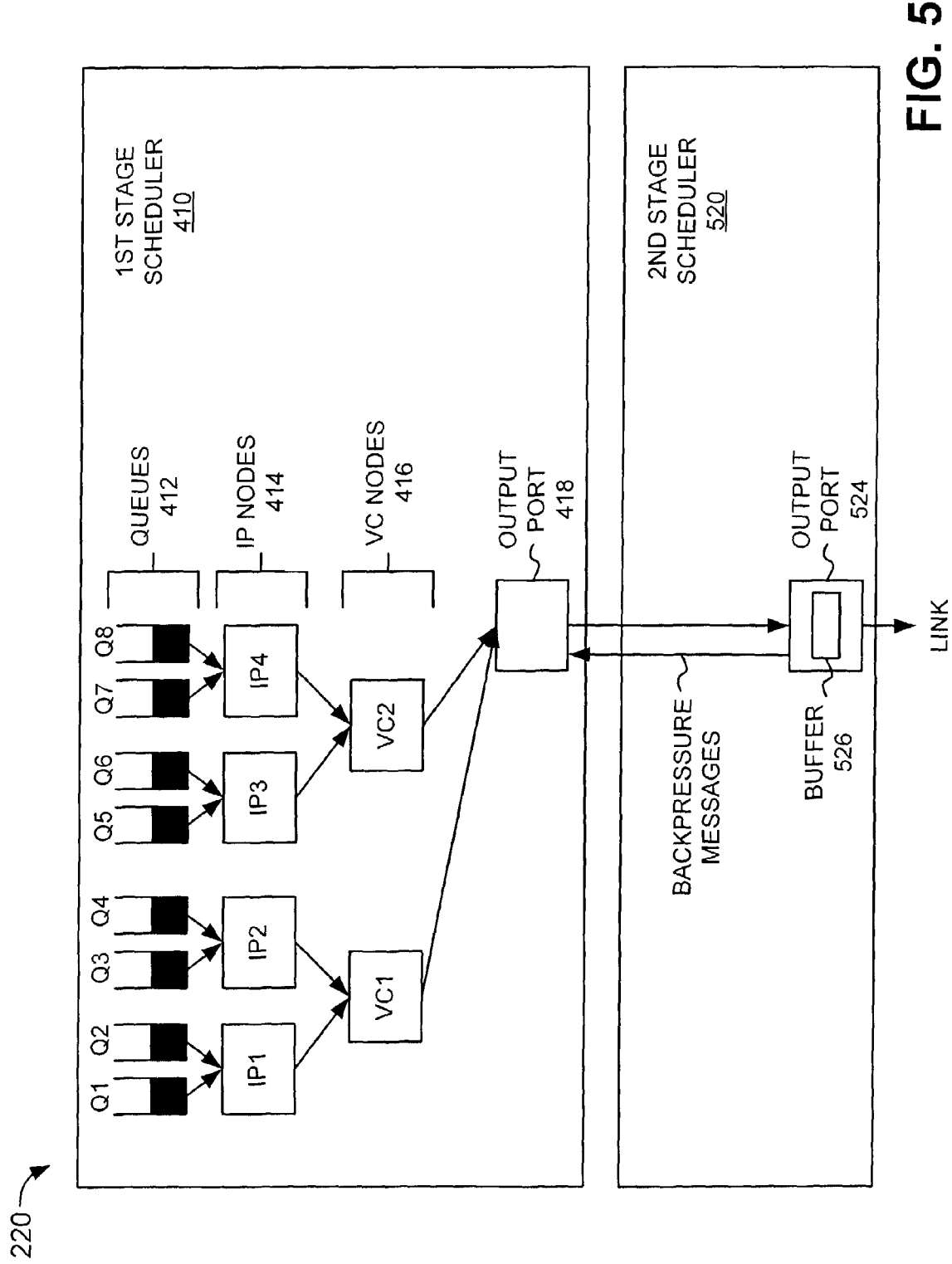
FIG. 5 is a block diagram illustrating an exemplary configuration of the schedulers of the I/O device when configured in the low-latency mode in an implementation consistent with the principles of the invention.

FIG. 5 is a block diagram illustrating an exemplary configuration of the schedulers of I/O 220 when configured in the low-latency mode in an implementation consistent with the principles of the invention. As illustrated, first stage scheduler 410 may be configured in a manner similar to that described above with respect to FIG. 4.

In this mode, second stage scheduler 520 includes an output port 524. Output port 524 receives and outputs cells received from first stage scheduler 410. In one implementation consistent with the principles of the invention, output port 524 includes a buffer 526 capable of storing a small amount of data. For example, buffer 526 may be capable of storing a few kilobytes of data. Similar to VC queues 422 in FIG. 4, buffer 526 may be associated with two thresholds. The first threshold is an upper threshold that directs output port 524 to send a port backpressure message to first stage scheduler 410 when the number of cells in buffer 526 is above the first threshold. The port backpressure message directs first stage scheduler 410 to stop sending cells to this output port 524. The second threshold is a lower threshold that directs output port 524 to send a port backpressure release message to first stage scheduler 410. The port backpressure release message directs first stage scheduler 410 to resume sending cells to this output port 524.

Therefore, unlike the ATM mode where second stage scheduler 420 controls the transfer of data from first stage scheduler 410 on a per VC basis, second stage scheduler 520 appears more like a wire in the low-latency mode by simply signaling to first stage scheduler 410 that the port is on/off. As such, first stage scheduler 410 is the dominant scheduler in the low-latency mode. First stage scheduler 410 can assign different weights to VC nodes 416 and have these weights reflected in the actual data transmitted on the network link by second stage scheduler 520. That is, second stage scheduler 520 transfers data on the network link in the order determined by first stage scheduler 410.

As an example, assume that first stage scheduler 410 performs weighted round robin scheduling, where VC node VC1 is permitted to transfer two data units (e.g., packets) for every one data unit that VC node VC2 is permitted to transfer. Processing may begin with VC node VC1 transmitting a data unit through output port 418 to output port 524. Assume further that this data unit causes the contents of buffer 526 in output port 524 to exceed the upper threshold. In response, output port 524 may send a port backpressure message to first stage scheduler 410, instructing first stage scheduler 410 to stop sending data units. When the contents of buffer 526 in output port 524 goes below the lower threshold, output port 524 may send a port backpressure release message to first stage scheduler 410 that permits first stage scheduler 410 to resume sending data units. In response, VC node VC1 may send a second data unit to second stage scheduler 520. If no port backpressure message is received, VC node VC2 may send a data unit to second stage scheduler 520 and processing would continue as described above.

The low CDV mode is another mode in which the first and second stage schedulers may operate. Unlike the ATM and low-latency modes, in the low CDV mode, the first stage scheduler is the more dominant scheduler, but the second stage scheduler shapes VPs and/or VCs to convert frame-atomic bursts of cells from the first stage scheduler to CDVT-conformant streams of interleaved cells. In the low CDV mode, there is no VC backpressure and the port backpressure is loose so as to allow several megabytes of cells to reside in the buffer pool of the second stage scheduler. The loose port backpressure allows the second stage scheduler to shape VCs and VPs without blocking strict priority traffic in the first stage scheduler.

Figure 6:
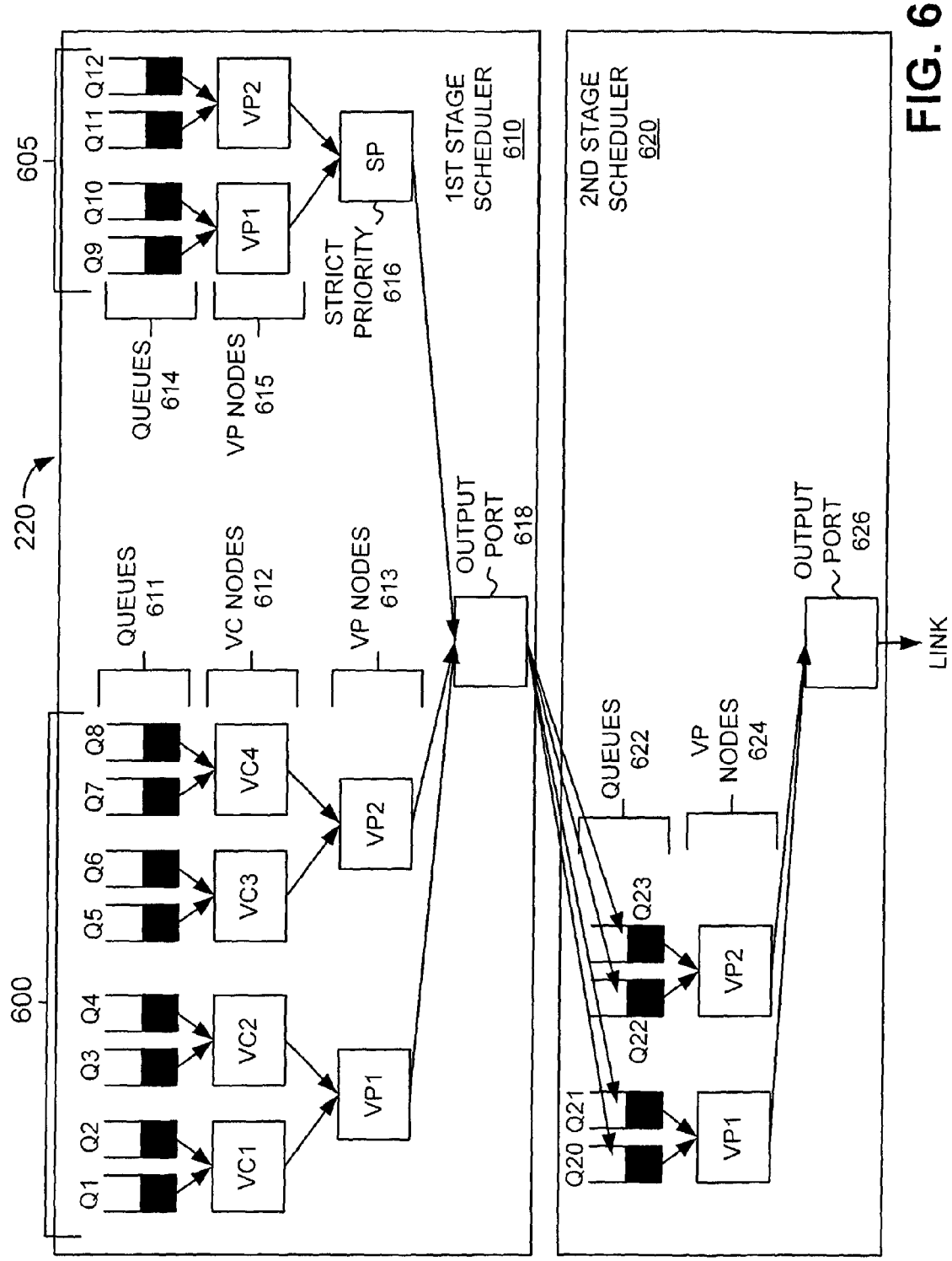
FIG. 6 is a block diagram illustrating an exemplary configuration of the schedulers of the I/O device when configured in the low cell delay variation (CDV) mode in an implementation consistent with the principles of the invention.

FIG. 6 is a block diagram illustrating an exemplary configuration of the schedulers of I/O 220 when configured in the low CDV mode in an implementation consistent with the principles of the invention. First stage scheduler 610 may be divided into a non-strict priority section 600, where, for example, weighted round robin or some other type of scheduling may be performed, and a strict priority section 605, where strict priority scheduling may be performed. Thus, first stage scheduler 610 may perform both weighted round robin scheduling and strict priority scheduling.

The non-strict priority section of first stage scheduler 610 may include queues 611 and a hierarchical arrangement of scheduler nodes (i.e., VC nodes 612 and VP nodes 613). These queues 611 and nodes 612 and 613 may be configured in a manner similar to that described above with respect to FIGS. 4 and 5. The strict priority section of first stage scheduler 610 may include queues 614, VP nodes 615, and strict priority node 616. Queues 614 may store strict priority data units (e.g., packets) for different VCs within a VP. As illustrated in FIG. 6, two VCs are associated with each VP. For example, VC nodes VC1 and VC2 are associated with VP node VP1. It will be appreciated that, in practice, more or less than two VCs may be associated with a VP. Therefore, queue Q9 may store strict priority data units for VC node VC1, while queue Q10 stores strict priority data units for VC node VC2. In this way, first stage scheduler can provide per-packet strict priority scheduling.

Strict priority node 616 manages VP nodes 615 and queues 614 above it. In one implementation, strict priority node 616 provides no buffering, but merely makes the decision from which VP node 615 and queue 614 data units will be forwarded to second stage scheduler 620 through output port 618. Output port 618 transmits data units received from VP nodes 613 and strict priority node 616 to second stage scheduler 620.

In addition to strict priority scheduling, first stage scheduler 610 can, as described above, provide other types of Quality of Service (QoS) scheduling, such as weighted round robin scheduling. In fact, first stage scheduler 610 can be configured by the user to meet the user's demands. For example, a user can allocate nodes in first stage scheduler 610 on a VP basis or can omit the VPs if the user is not interested in controlling bandwidth on a VP basis.

Second stage scheduler 620 provides the ability to do traffic shaping on a cell-by-cell basis, thereby allowing the traffic sent out on the network link to conform to ATM protocols. So, even though first stage scheduler 610 may send bursts of cells for a particular VC or VP to second stage scheduler 620 in succession, second stage scheduler 620 will interleave the cells from different VCs and different VPs to conform to ATM protocols. Moreover, the shaping will be configured in the two schedulers symmetrically (e.g., if VP node VP1 is shaped to a rate of one megabit per second in first stage scheduler 610, VP node VP1 in second stage scheduler 620 will be shaped to a rate of one megabit per second).

Second stage scheduler 620 may include a buffer pool, represented by queues 622, a group of scheduler nodes 624 (referred to as "VP nodes") that correspond to VP nodes 613/615 in first stage scheduler 610, and an output port 626. Queues 622 may be associated with VC nodes 612 from first stage scheduler 610. For example, queue Q20 may correspond to VC node VC1, while Q21 may correspond to VC node VC2. In one implementation consistent with the principles of the invention, each queue 622 may store one frame at a time. If strict priority scheduling is performed in first stage scheduler 610 and scheduler 610 attempts to put the strict priority frame ahead of all other frames for a particular VC, when the frame arrives at second stage scheduler 620, there will be at worst one frame ahead of it. Therefore, strict priority behavior is fairly maintained.

Each VP node 624 manages queues 622 above the respective node. For example, VP node VP1 manages queues Q20 and Q21. Second stage scheduler 620 may perform round robin scheduling for transmitting cells on the network link in order to interleave the cells from different VCs and different VPs. For example, second stage scheduler 620 may transmit a cell from queue Q20 through VP node VP1, a cell from queue Q22 through VP node VP2, a cell from queue Q21 through VP node VP1, etc. Output port 626 transmits cells from VP nodes 624 on the network link.

As described above, port backpressure is used to keep the cell count low in second stage scheduler 620. This allows second stage scheduler 620 to configure traffic shaping on either a VP or VC level. So, as described above, even if first stage scheduler 610 sends bursts of back-to-back cells to second stage scheduler 620 for a particular VC, second stage scheduler 620 can do shaping on a cell-by-cell basis (i.e., second stage scheduler 620 can interleave cells from different VCs and different VPs), which will allow the traffic coming out of second stage scheduler 620 to conform to ATM protocols.

It will be appreciated that the components illustrated in FIGS. 4-6 has been provided for simplicity. In practice, the first stage scheduler and the second stage scheduler may include more or fewer queues, IP nodes, VC nodes, VP nodes, strict priority nodes, and output ports than illustrated in FIGS. 4-6. For instance, first stage scheduler 410 (FIG. 4) may include more than one thousand VC nodes 416 and second stage scheduler 420 may include a corresponding number of queues 422. It will be further appreciated that the first stage scheduler and the second stage scheduler may include other components than those illustrated in FIGS. 4-6 to aid in the reception, processing, and/or transmission of data on the network link.

As apparent from the above description, the ATM and low-latency modes are primarily backpressure-driven. The decision as to whether traffic should be sent from the first stage scheduler to the second stage scheduler is based on the upper and lower thresholds in VC queues 422 (FIG. 4) in the ATM mode and in buffer 526 in output port 524 (FIG. 5) in the low-latency mode. As also described above, the low CDV mode is also backpressure-driven to a lesser extent. The upper and lower thresholds that cause the backpressure messages to be transmitted from the second stage scheduler to the first stage scheduler may be fixed by the user (or customer) or may be dynamically adjusted based on the number of active connections (i.e., the number of egress flows with queue occupancy).

Figure 7:
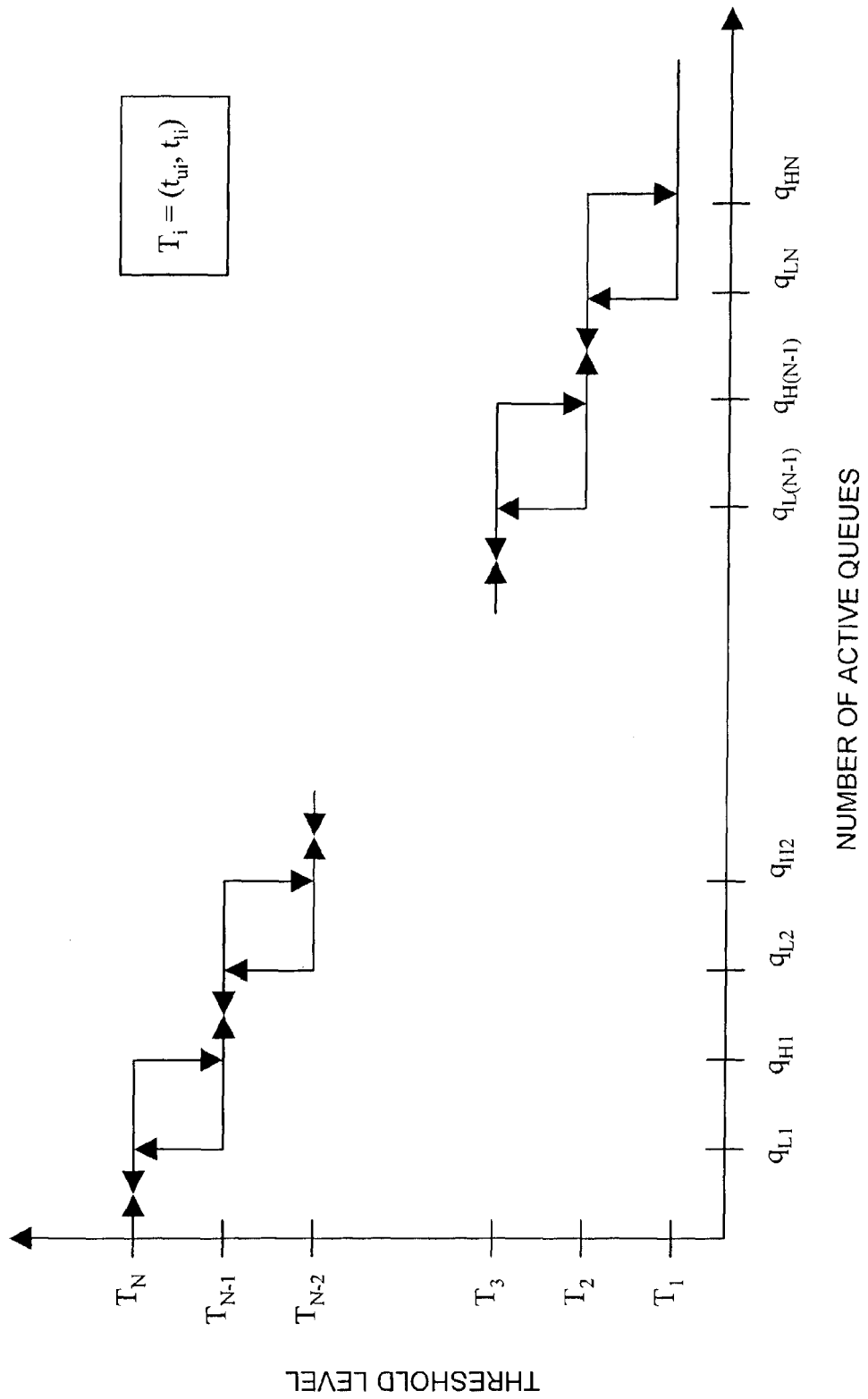
FIG. 7 is an exemplary chart showing the relationship between threshold level and number of active queues.

FIG. 7 is an exemplary chart showing the relationship between threshold level and number of active queues. As illustrated, the lower region of active numbers of active queues may be set to be approximately linear to satisfy the turn-around requirements of the backpressure mechanism. The higher region of active numbers of queues may be set to be approximately exponential to provide better statistical buffer utilization. This type of scheme minimizes latency while maintaining line rate over varying buffering requirements.

CONCLUSION

Systems consistent with the principles of the present invention provide improved scheduling in routing devices. Each line card of a routing device may include two schedulers that may be formed on a single ASIC or separate ASICs and connected in series. Different configurable mechanisms exist for integrating the two schedulers so that the user controls what type of behavior is manifested. For example, if the user (or customer) wants traditional ATM handling, the user can configure the schedulers to operate in the ATM mode described above, where the second stage scheduler is dominant. Alternatively, the customer can basically turn off the second stage scheduler and make the first stage scheduler dominant (i.e., configure the schedulers to operate in the low-latency mode). Or, the customer can integrate the two schedulers so that some features from the first stage scheduler (e.g., performing weighted round robin scheduling, strict priority scheduling, etc.) and some features from the second stage scheduler (e.g., performing shaping on a cell level) can show up together.

The foregoing description of embodiments of the invention provides illustration and description, but is not intended to be exhaustive or to limit the invention to the precise form disclosed. Modifications and variations are possible in light of the above teachings or may be acquired from practice of the invention. For example, while the above description focused on transmitting ATM cells from the second stage scheduler to the network link, implementations consistent with the principles of the invention are not so limited. In fact, the present invention is equally applicable to the transmission of data units for other protocols, such as Ethernet, packet over synchronous optical network technologies (SONET), etc.

Moreover, while ATM, low-latency, and low CDV modes were described above, it will be appreciated that the first and second stage schedulers can be configured in other modes based on customer requirements. Also, other types of backpressure messages may exist in the ATM, low-latency, and low CDV modes. For example, VP backpressure messages may be transmitted in the ATM mode in place of the VC backpressure messages described above.

Systems, apparatus, and methods consistent with the principles of the invention may process data transfer entities, such as packets, or one or more portions of the data transfer entities. For example, the one or more portions may include certain fields from a packet, information about the packet, etc.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A system for scheduling traffic, including a plurality of data units, in a network device, comprising:
   a first scheduler, including a plurality of queues to store the data units, to route the data units to a second scheduler, where the first scheduler and the second scheduler are configured to operate in three different configurable modes selected from:
      a first mode, in which the first scheduler determines which of a plurality of virtual channel (VC) nodes will route the data units to a corresponding one of a plurality of queues in the second scheduler, based on weights, determined via quality of service (QoS) scheduling, assigned to each of the VC nodes, and in which the second scheduler controls the routing of the data units, from the first scheduler, on a per VC basis;
      a second mode, in which the first scheduler determines which of the plurality of VC nodes will route the data units directly to an output port, including a buffer, of the second scheduler; and
      a third mode, in which the first scheduler includes a non-strict priority section that determines which of a plurality of virtual path (VP) nodes will route the data units to a plurality of queues in the second scheduler, based on weights, determined via quality of service (QoS) scheduling, and in which the first scheduler further includes a strict priority section that determines which of a second plurality of VP nodes will route the data units to the plurality of queues in the second scheduler, based on per-data unit strict priority; and
   the second scheduler is configured to schedule the data units for transmission.

2. The system of claim 1 where the QoS scheduling includes weighted round robin scheduling.

3. The system of claim 2 where the QoS scheduling further includes per-data unit strict priority scheduling.

4. The system of claim 1 where the first scheduler and the second scheduler are formed on at least one application-specific integrated circuit.

5. The system of claim 1 where each of the first scheduler and the second scheduler includes memory.

6. The system of claim 1 where, in the first mode, each of the plurality of queues queue corresponds to one of the plurality of scheduler nodes, is associated with an upper threshold, and transmits a backpressure message to the corresponding VC node when contents of the corresponding queue exceeds the upper threshold, the backpressure message instructing the corresponding VC node to stop sending the traffic to the corresponding queue.

7. The system of claim 6 where the upper threshold is dynamically adjustable.

8. The system of claim 6 where each of the plurality of queues is associated with a lower threshold, which is different than the upper threshold, and where each of the plurality of queues transmits a backpressure release message to the corresponding VC node when contents of the respective queue goes below the lower threshold, the backpressure release message instructing the corresponding VC node to resume sending the traffic to the corresponding queue.

9. The system of claim 1 where, in the second, the buffer is associated with an upper threshold, and transmits a backpressure message to the first scheduler when contents of the buffer exceeds the upper threshold, the backpressure message instructing the first scheduler to stop sending the traffic to the output port.

10. The system of claim 9 where the upper threshold is dynamically adjustable.

11. The system of claim 9 where each of the at least one output port is associated with a lower threshold, and where each of the at least one output port transmits backpressure release message to the first scheduler when contents of the buffer goes below the lower threshold, the backpressure release message instructing the first scheduler to resume sending the traffic to the output port.

12. The system of claim 1 where, in the third mode, the non-strict priority section first scheduler performs weighted round robin scheduling.

13. In a network device, a line card to schedule traffic, including data units of a first type, the line card comprising:

a first scheduler to perform quality of service (QoS) scheduling of the data units of a first type and to route all of the traffic, based on the QoS scheduling, in the form of data units of a second type, to a second scheduler, connected in series to the first scheduler, to schedule the routed traffic, where the first scheduler and the second scheduler are configured to operate in one of multiple modes, where:

in a first of the multiple modes, the first scheduler includes a plurality of scheduler nodes, and the second scheduler includes a plurality of queues, where each queue corresponds to one of the plurality of scheduler nodes, each queue is associated with an upper threshold, and each queue transmits a backpressure message to the corresponding scheduler node when contents of the corresponding queue exceeds the upper threshold, the backpressure message instructing the corresponding scheduler node to stop sending the traffic to the corresponding queue, in a second of the multiple modes, the second scheduler includes at least one output port including a buffer, the buffer being associated with an upper threshold, and the buffer transmitting a port backpressure message to the first scheduler when contents of the buffer exceeds the upper threshold, the port backpressure message instructing the first scheduler to stop sending the traffic to the output port, and in a third of the multiple modes, the first scheduler performs weighted round robin scheduling and per-data unit strict priority scheduling, and the second scheduler performs round robin scheduling.

14. The line card of claim 13 where the first type of data units includes packets and the second type of data units includes asynchronous transfer mode (ATM) cells.

15. The line card of claim 13 where the scheduling performed by the first scheduler includes at least one of weighted round robin scheduling or per-data unit strict priority scheduling, and the scheduling performed by the second scheduler includes round robin scheduling.

16. The line card of claim 13 where each of the first scheduler and the second scheduler includes a buffer pool.

17. A method for transmitting traffic on an output link of a network device that includes a first scheduler to perform quality of service (QoS) scheduling of the traffic and to route all of the traffic, based on the QoS scheduling, to a second scheduler, the method comprising:

operating the network device in one of a plurality of user configurable modes, where in a first of the plurality of user configurable modes, the first scheduler includes a plurality of scheduler nodes, and the second scheduler includes a plurality of queues, where each queue corresponds to one of the scheduler nodes, is associated with an upper threshold, and transmits a backpressure message to the corresponding scheduler node when a content of the corresponding queue exceeds the upper threshold, the backpressure message instructing the corresponding scheduler node to stop sending the traffic to the corresponding queue, in a second of the plurality of user configurable modes, the second scheduler includes at least one output port including a buffer, the buffer being associated with an upper threshold, and transmits a port backpressure message to the first scheduler when a content of the buffer exceeds the upper threshold, the port backpressure message instructing the first scheduler to stop sending the traffic to the output port, and in a third of the plurality of user configurable modes, the first scheduler performs weighted round robin scheduling and per-data unit strict priority scheduling, and the second scheduler performs round robin scheduling; and transmitting data units on the output link based on the user configurable mode in which the network device operates.

* * * * *